(12) United States Patent
Kumar et al.

(10) Patent No.: US 7,670,148 B2
(45) Date of Patent: Mar. 2, 2010

(54) AUTOMATION CONTROLLER I/O MODULE

(75) Inventors: Shalabh Kumar, Kildeer, IL (US); Larry Freiberg, Bettendorf, IA (US)

(73) Assignee: Shaltech, Inc., Bottendorf, IA (US)

( * ) Notice: Subject to any disclaimer, the term of this patent is extended or adjusted under 35 U.S.C. 154(b) by 0 days.

(21) Appl. No.: 11/625,342

(22) Filed: Jan. 21, 2007

(65) Prior Publication Data

US 2007/0173079 A1    Jul. 26, 2007

Related U.S. Application Data

(60) Provisional application No. 60/766,474, filed on Jan. 21, 2006.

(51) Int. Cl.
*H01R 12/00* (2006.01)
(52) U.S. Cl. .................. 439/76.2; 439/50; 361/728
(58) Field of Classification Search .......... 439/76.1, 439/50, 540.1, 709
See application file for complete search history.

(56) References Cited

U.S. PATENT DOCUMENTS

| 5,113,317 | A | * | 5/1992 | Howe .................. 361/785 |
| 5,329,428 | A | * | 7/1994 | Block et al. ........... 361/785 |
| 5,483,229 | A | * | 1/1996 | Tamura et al. ......... 340/691.7 |
| 5,766,026 | A | * | 6/1998 | Cooper et al. ......... 439/76.1 |
| 6,485,322 | B1 | * | 11/2002 | Branch et al. ......... 439/357 |
| 6,634,910 | B2 | * | 10/2003 | Lieb et al. ............ 439/715 |
| 6,961,233 | B2 | * | 11/2005 | Hoeing et al. ......... 361/622 |
| 7,052,315 | B2 | * | 5/2006 | Murr et al. ............ 439/540.1 |
| 7,481,680 | B2 | * | 1/2009 | Caveney et al. ........ 439/676 |

* cited by examiner

*Primary Examiner*—Michael C Zarroli
(74) *Attorney, Agent, or Firm*—Thomas R. Vigil

(57) ABSTRACT

This invention describes an I/O module for a modular automation controller. The controller has a main assembly including a motherboard. The I/O modules plug into the motherboard. The modules are parallel to the motherboard allowing use of surface mount LED indicators reducing manufacturing costs. The modules use a plastic cover which retains the module's PCA as well latches the module to the motherboard, making the automation controller less expensive.

9 Claims, 6 Drawing Sheets

AUTOMATION CONTROLLER I/O MODULE

CROSS REFERENCE TO RELATED APPLICATIONS

This application is entitled to the benefit of Provisional Patent Application Ser. No. 60/766,474 submitted on Jan. 21, 2006.

FEDERALLY SPONSORED RESEARCH

Not applicable.

SEQUENCE LISTING OR PROGRAM

Not applicable

FIELD OF THE INVENTION

The present invention relates to the field of industrial control or automation, particularly to the mechanical architecture of automation controller and its I/O modules.

BACKGROUND OF INVENTION

Current Modular Automation Controllers (FIG. 1), such as PLCs, typically consist of a rack 10 with a backplane 11, a power supply 12, a controller 13, and one or more plug-in I/O modules 14. The modules typically consist of one or more printed circuit board assemblies (PCA) 15 with a plastic or metal housing. The housing provides protection to the PCA, possibly terminal block or connectors 6 for field wiring and possibly I/O indicators 17. The PCA is secured to the housing typically using screws. The I/O module 14 is placed in the rack, and mates with a connector 18 in the backplane 11. The module 14 may be secured by some means, such as screws to the rack 10.

This type of I/O module construction which is typical of current modular automation controllers requires that the mating connector to the backplane, field-wiring connector 16, and indicator LEDs 17, all be of right angle type. This makes manufacturing of such modules expensive, as most automatic assembly lines are not able to place these types of components automatically. Such automation controllers and their I/O modules therefore are relatively expensive. The less expensive automation controllers tend to be non-modular, i.e. the type and number of I/O is factory ordered.

In this construction, to provide higher field wiring density while keeping the I/O module as slim as possible, the LED indicators 17 are not placed next to the I/O connection points 16, making it inconvenient for the users. Further this requires that the LED Indicators be either of right angle type, or placed (straight or surface mount LEDs) on an additional small PCA that would be perpendicular to main board, or special LED indicator block that can be mounted on the main board. In any case it is more expensive than having surface mounted LED placed directly on a printed circuit board that ha all other components.

This invention takes a different approach to modular automation controllers. The new approach allows for modular controllers that are less expensive to manufacture.

SUMMARY OF INVENTION

This invention describes a modular automation controller and its I/O modules (FIG. 2). The main assembly 20 of the controller has processor, power supply, and communication ports all in one assembly. The I/O modules 21 are housed in a plastic cover which holds PCA for the I/O module using built-in PCB retaining snaps eliminating need for screws, as well as have necessary latches for securing modules to the main assembly. This reduces material and labor costs. Due to the orientation of the module, it is possible to use surface mount LEDs and straight connectors making manufacturing more cost effective. In addition the LED indicators are placed next to corresponding I/O points making it very user friendly.

BRIEF DESCRIPTION OF DRAWINGS

FIG. 1 shows a typical modular Automation Controller (prior art).

FIG. 2 shows Automation Controller described in this invention.

FIGS. 3A and 3B show two views of I/O module cover of this invention.

FIG. 4A shows a printed circuit board of a module and 4B shows a complete I/O module.

DESCRIPTION OF INVENTION

Figure 1:
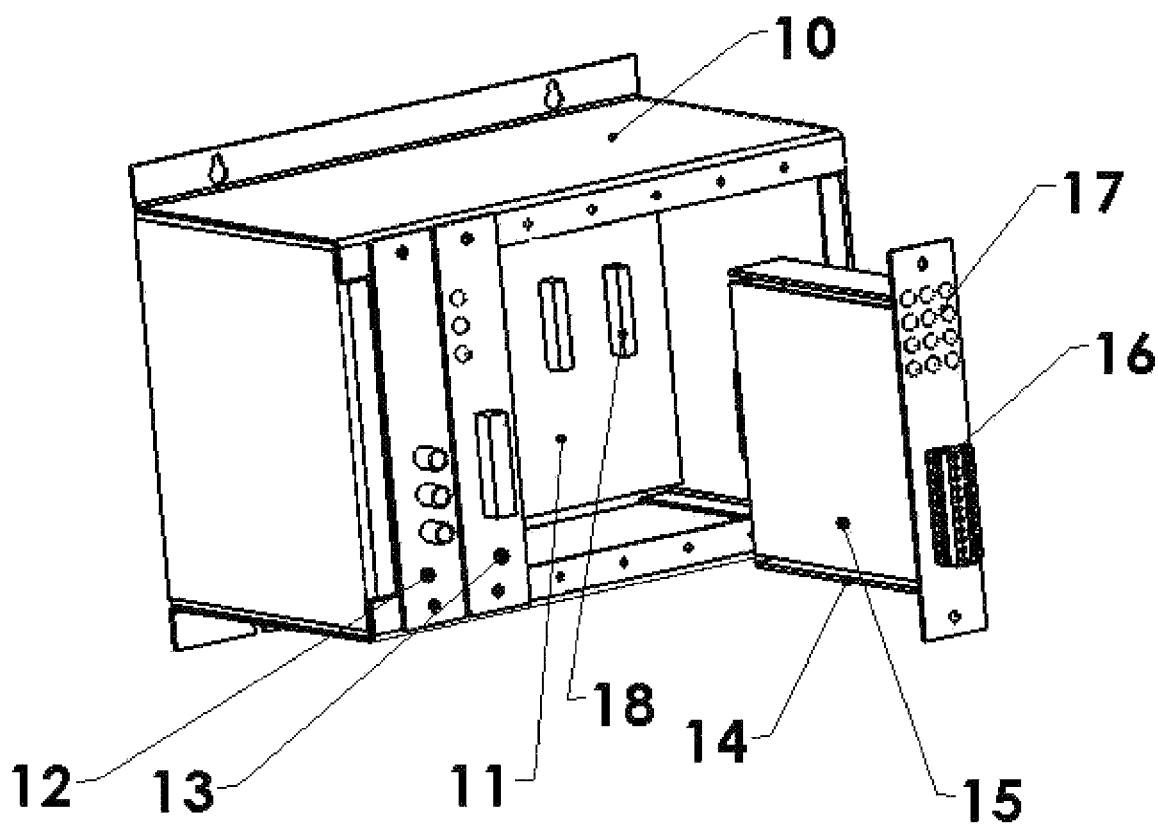
FIG. 1.
Figure 2:
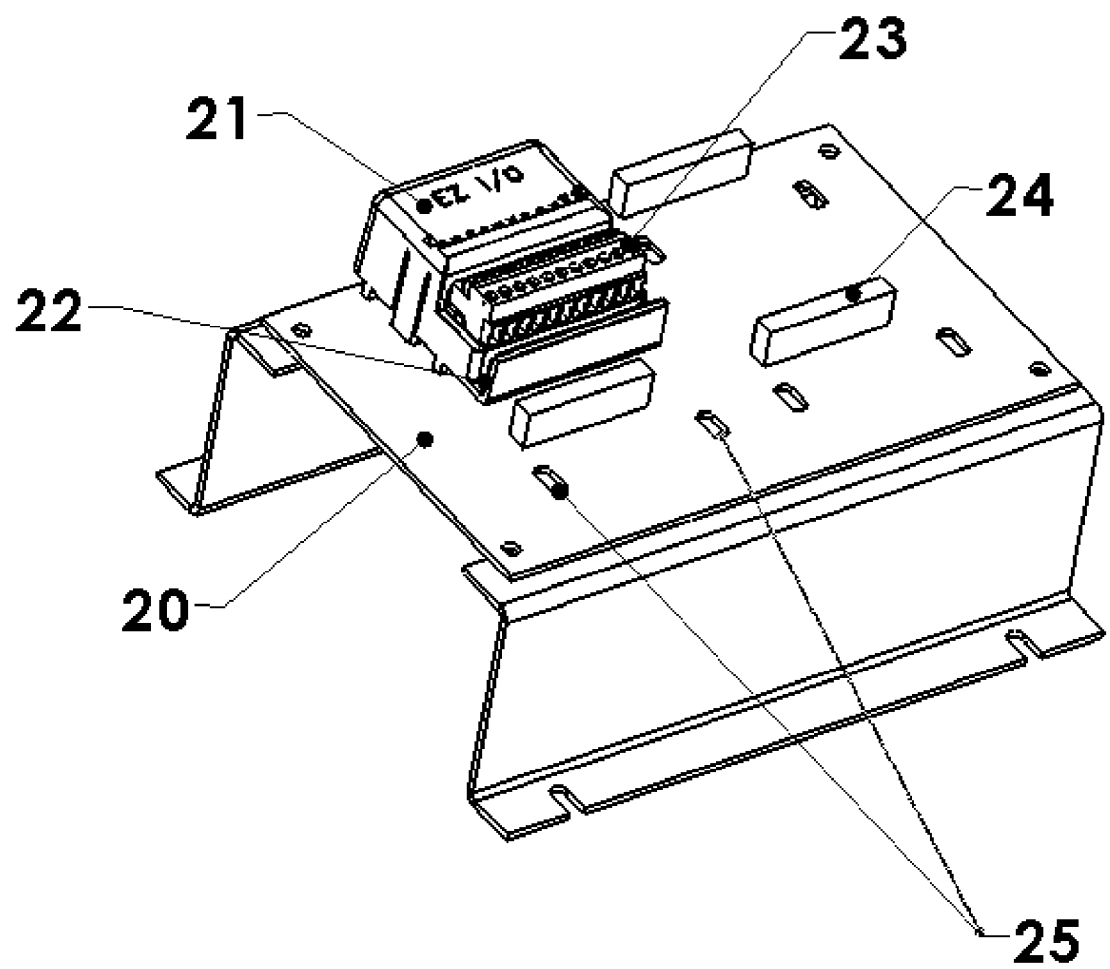
FIG. 2.

FIG. 2 shows one embodiment of modular automation controller of current invention populated with one I/O module. The main assembly 20 of the controller has processor, power supply, and communication ports all in one assembly. A motherboard is provided for plugging in modular I/O. The plug-in I/O module 21 is housed in a plastic cover. I/O module 21 is plugged into connector 24 on the motherboard of the assembly. The field wiring is done using connector 23 on the module. Wires are routed using a built-in trough 22 in the module cover. Connector 23 is removable for convenience. The I/O module's PCA is parallel to the motherboard in this approach as against being perpendicular in current modular automation controllers. Slots 25 in the motherboard mates with module covers flexible latches 33 (in FIG. 3A).

Figure 3A:
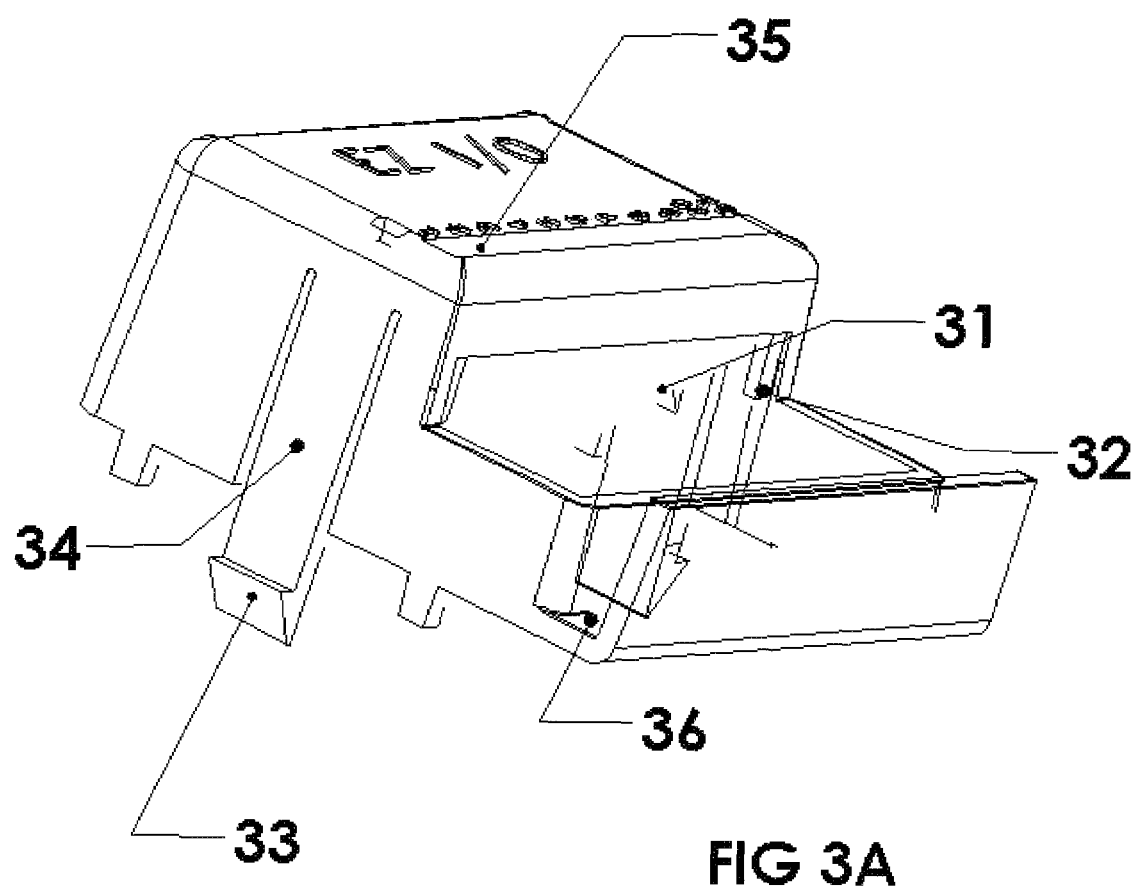
FIGS. 3A and 3B.
Figure 3B:
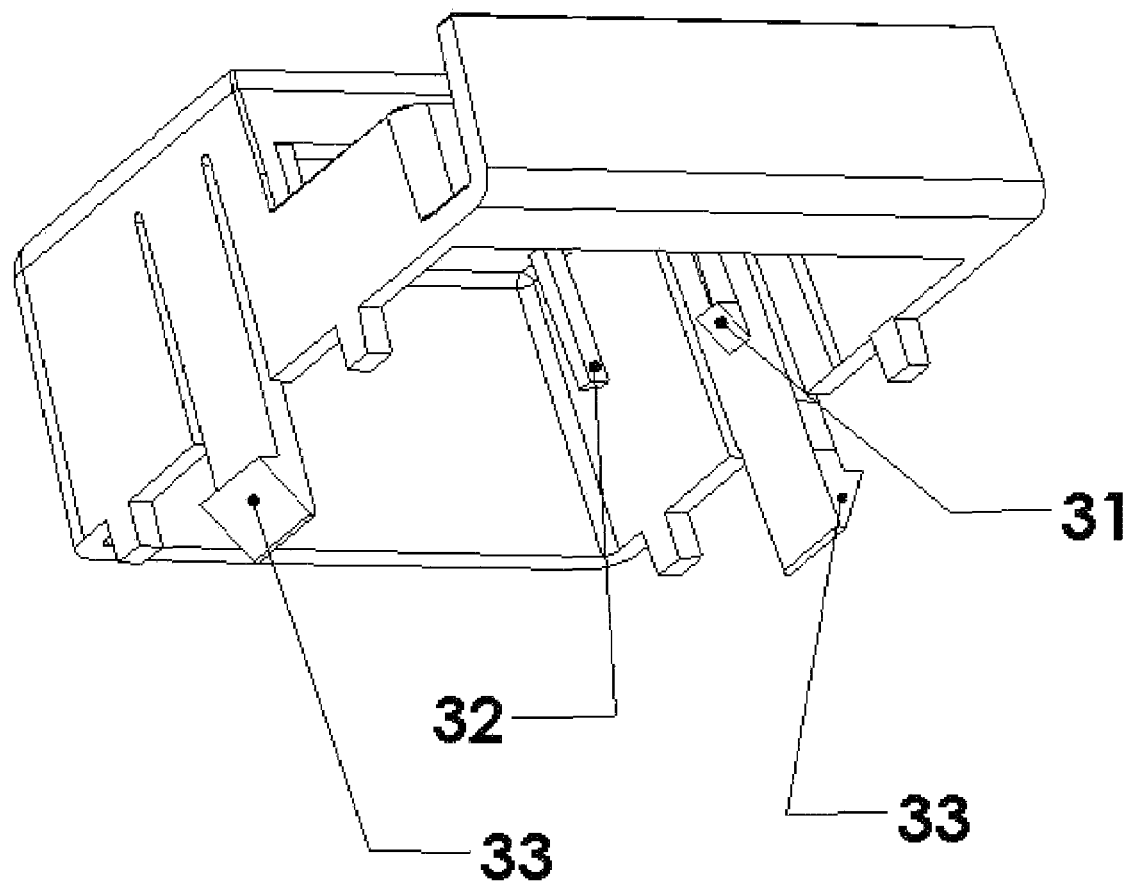

Two views of the I/O module plastic cover are shown in Fig 3A and 3B. Snaps 31 (two of these, one on each side) are used to hold module's printed circuit board assembly (PCA). Four posts 32 help in locating the PCA making assembly of the module very easy. Two latches 33 are used to retain the module in the main assembly 20. The snaps 31 and latches 33 are on flexible member 34 which can flex to allow easy insertion and removal of the module from the main assembly as well as the PCA from the cover. During assembly of the PCA is pushed into the module cover. Flexible member 34 gives way so that the PCA is easily inserted in the module. Posts 32 guide the PCA. The PCA is retained by snaps 31 which snap into place. To take the PCA out of the module cover simply pull two members 34 away from each other, and take the PCA out of the module cover. To insert the complete module in a mother board 20, simply compress the two members 34, and insert the module. The latches 33 get inserted in to corresponding slots 25 in motherboard, while connector on the module's PCA mates with the connector 24 on the motherboard. Indicator LEDs corresponding to the each I/O point on the connector are placed next to the point on the FCA and are visible through the clear windows 35 in the plastic housing. The cover also has a wiring trough 36 to route the field wires.

The location and size of snaps, posts and latches depends on many variables including the size of PCA and plastic material used. In the present embodiment, the module cover is made of ABS plastic, the latches and snaps are $\frac{1}{16}$" wide. The material of the cover is 0.070" thick.

Figure 4A:
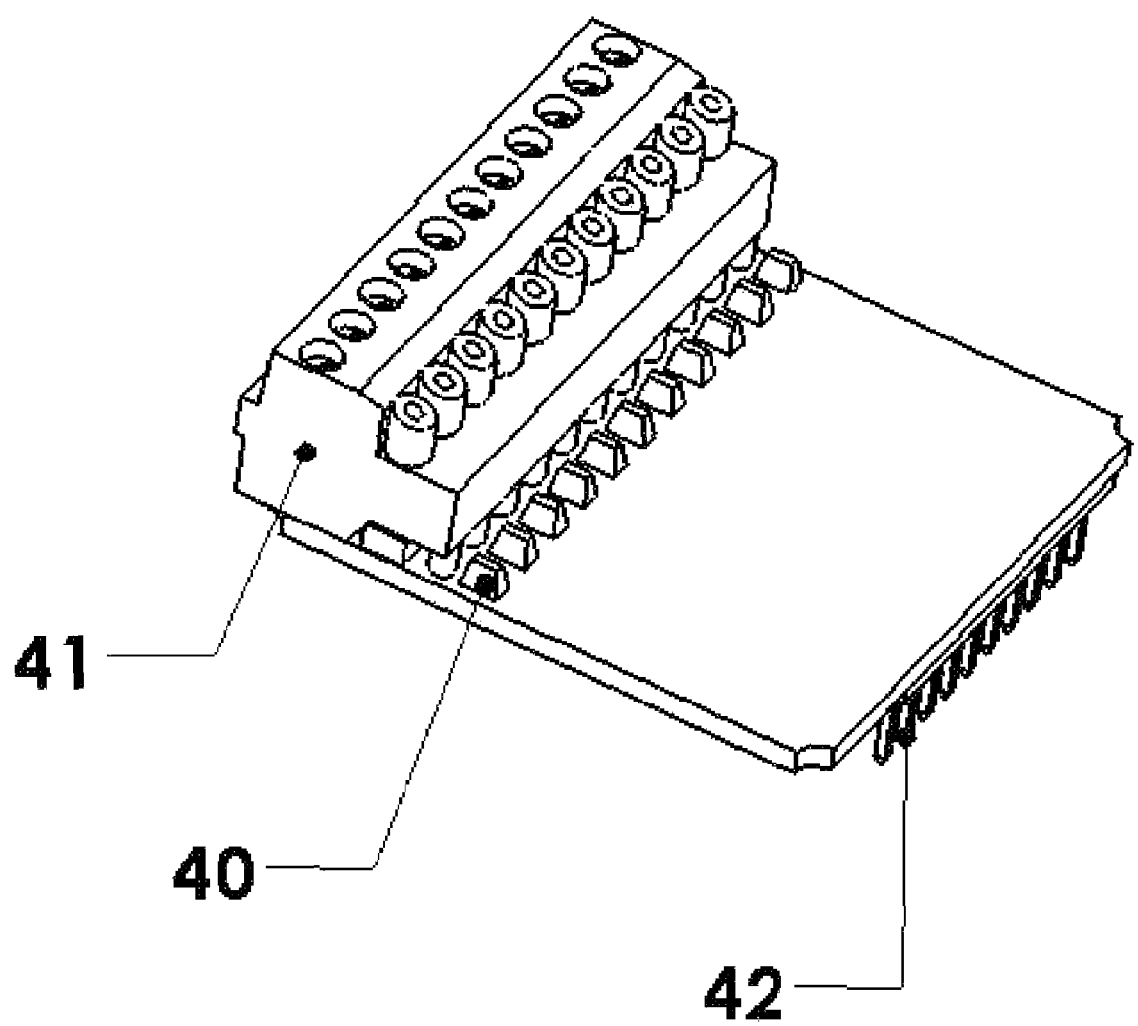
FIGS. 4A and 4B.
Figure 4B:
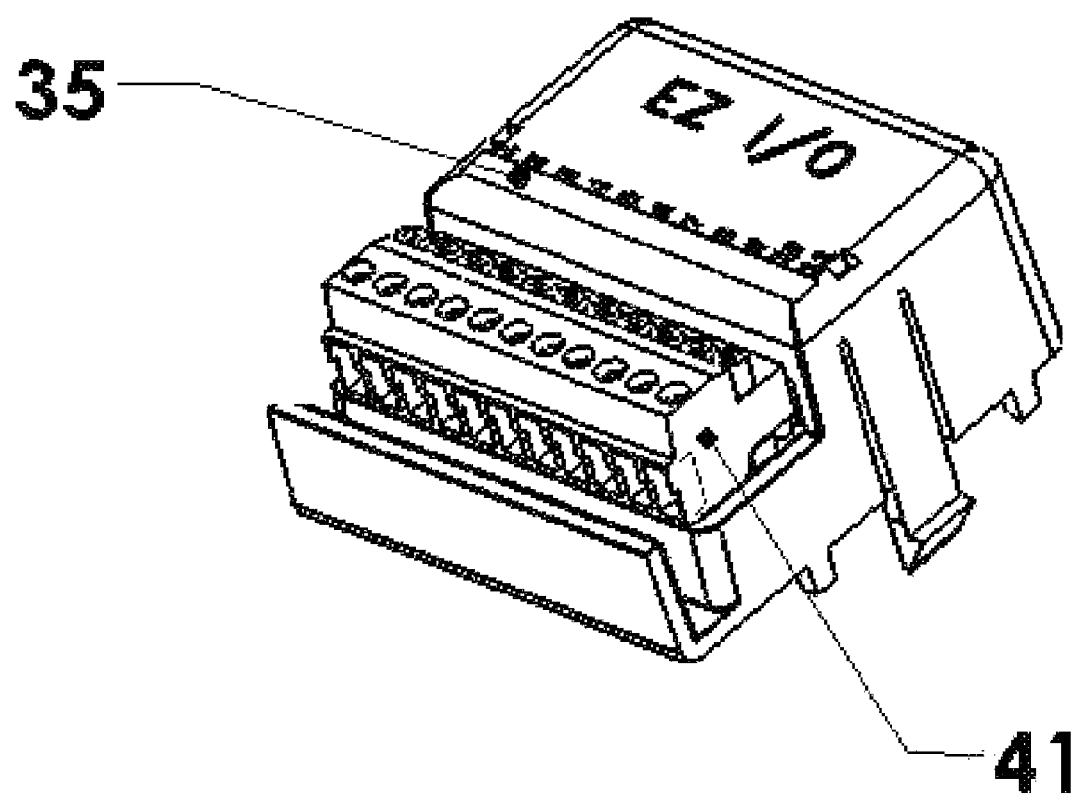

FIG. 4A shows a PCA for a modular I/O, and FIG. 4B shows an assembled input/output module (module PCA within the module cover), As mentioned before, surface mount indicator LEDs 40 are used (as against leaded right angle LED or blocks used on most current modular I/O modules). The field wiring connector 41 is straight, and LED corresponding to each I/O point is placed next to the point. LEDs 40 are visible through the clear window 35 on the module cover. Field wiring connectors 42 are removable from the PCA. Connector 42 mates with the connector 24 on the motherboard 20.

What is claimed is:

1. In a modular automation controller comprising a motherboard and one or more field-replaceable input/output control modules, an I/O module comprising a housing and a printed circuit board assembly (PCA), with means for retaining said PCA within said housing without screws, and means for mounting said module on said motherboard without screws, said retaining means comprising guide posts and snaps; said mounting means comprising latches molded in said housing, and said mounting means snap into slots in said motherboard and wherein said retaining means can flex to snap said printed circuit board assembly in place.

2. The I/O module of claim 1 wherein said mounting means can flex to snap into said slots in said motherboard.

3. In a modular automation controller comprising a motherboard and one or more electronic input/output control modules, an I/O module comprising a housing and a printed circuit board assembly (PCA), wherein said PCA contains a connector comprising a plurality of terminals to wire input/output devices and indicators to indicate status of said input/output devices and wherein said indicators are placed next to corresponding terminals, wherein said indicators comprise surface mounted Light Emitting Diodes.

4. An I/O module of claim 3 wherein said housing has a closed top with see through windows for said indicators.

5. In a modular automation controller comprising a motherboard and one or more field-replaceable electronic input/output control modules, an I/O module comprising a housing and a printed circuit board assembly (PCA), wherein said PCA contains a connector comprising a plurality of terminals to mate into corresponding terminals on said motherboard and said connector allows said PCA to mate to said motherboard in a parallel direction, said PCA includes means for connecting said I/O modules to field devices including relays, valves and solenoids.

6. In a modular automation controller comprising a motherboard and one or more field-replaceable electronic input/output control modules, said motherboard comprising a printed circuit board and a plurality of electrical and mechanical components, said input/output modules comprising one or more printed circuit boards and a plurality of electronic and mechanical components, an I/O input/output module having mechanical and electrical means to connect to said motherboard and wherein said printed circuit boards of said motherboard and said input/output modules are parallel to each other, said PCA includes means for connecting said I/O modules to field devices including relays, valves and solenoids.

7. The I/O module of claim 6 wherein said mechanical and electrical means comprise male and female connectors to mate with each other.

8. In a modular automation controller comprising a motherboard and one or more electronic input/output control modules, an I/O module comprising a housing and a printed circuit board assembly (PCA), wherein said PCA contains a connector comprising a plurality of terminals to wire input/output devices, said terminals having means for a quick connect or disconnect of said wires from said input/output devices.

9. In a modular automation controller comprising a motherboard and one or more input/output modules, an I/O module comprising a housing and a printed circuit board assembly (PCA), wherein said PCA contains a connector comprising plurality of terminals to wire input/output devices and indicators to indicate status of said input/output devices and wherein said indicators are placed next to corresponding said terminals and said indicators are surface mount Light Emitting Diodes.

* * * * *

UNITED STATES PATENT AND TRADEMARK OFFICE
CERTIFICATE OF CORRECTION

PATENT NO. : 7,670,148 B2
APPLICATION NO. : 11/625342
DATED : March 2, 2010
INVENTOR(S) : Shalabh Kumar and Larry Freiberg It is certified that error appears in the above-identified patent and that said Letters Patent is hereby corrected as shown below:

On the Title Page, item [73] Assignee:

Change: "Bottendorf"

To: --Bettendorf--.

Column 1, line 32, "6" should be --16--.

Signed and Sealed this
Fifth Day of April, 2011

David J. Kappos
*Director of the United States Patent and Trademark Office*